United States Patent [19]

Shimizu et al.

[11] Patent Number: 5,164,426

[45] Date of Patent: Nov. 17, 1992

[54] AQUEOUS DISPERSION, COMPOSITE POWDER AND ORGANOSOL OF FLUORINE-CONTAINING POLYMER

[75] Inventors: Tetsuo Shimizu; Seitaro Yamaguchi, both of Osaka, Japan

[73] Assignee: Daikin Industries Ltd., Osaka, Japan

[21] Appl. No.: 709,155

[22] Filed: Jun. 3, 1991

Related U.S. Application Data

[62] Division of Ser. No. 505,464, Apr. 6, 1990, Pat. No. 5,030,667.

[30] Foreign Application Priority Data

Apr. 15, 1989 [JP] Japan ................................. 1-96033

[51] Int. Cl.$^5$ .............................................. C08L 27/12
[52] U.S. Cl. ..................... 523/201; 525/276; 525/902
[58] Field of Search ................. 523/201; 525/902, 276

[56] References Cited

U.S. PATENT DOCUMENTS

| | | |
|---|---|---|
| 4,036,802 | 7/1977 | Poirier ................... 525/276 |
| 4,038,231 | 7/1977 | Downer et al. ........... 525/276 |
| 4,564,561 | 1/1986 | Love et al. ............. 428/422 |
| 4,780,490 | 10/1988 | Mizuno et al. .......... 523/201 |

Primary Examiner—Paul R. Michl
Assistant Examiner—John J. Guarriello
Attorney, Agent, or Firm—Birch, Stewart, Kolasch & Birch

[57] ABSTRACT

An aqueous dispersion comprising composite colloidal particles having an average particle size of 0.05 to 1.0 micrometer each of which comprises a core made of a copolymer comprising 99–100% by weight of tetrafluoroethylene and 0 to 1% by weight of a fluorine-containing olefin which is copolymerizable with tetrafluoroethylene and a shell made of a polymer having a glass transition temperature of at least 50° C. which comprises (a) 60 to 100% by mole of at least one α-substituted acrylate of the formula:

$$CH_2=CXCOOR_f \qquad (I)$$

wherein X is a methyl group, a fluorine atom or a trifluoromethyl group, and $R_f$ is a fluoroalkyl group or a fluoro(alkoxyalkyl) group and (b) 0 to 40% by mole of at least one monomer copolymerizable with said acrylate (I), from which composite fluorine-containing polymer particles having good redispersibility in a liquid medium and improved blending properties with other resins or elastomers are prepared and from which an organosol of the composite fluorine-containing polymer particles is formed.

16 Claims, No Drawings

AQUEOUS DISPERSION, COMPOSITE POWDER AND ORGANOSOL OF FLUORINE-CONTAINING POLYMER

This application is a divisional of copending application Ser. No. 505,464, filed on Apr. 6, 1990 now U.S. Pat. No. 5,030,667, the entire contents of which are hereby incorporated by reference.

BACKGROUND OF THE INVENTION

1. Field of the Invention

The present invention relates to an aqueous dispersion, composite powder and an organosol of a fluorine-containing polymer.

2. Description of the Related Art

Organosol

An organosol of polytetrafluoroethylene (hereinafter referred to as "PTFE") is known as a coating material which provides a coating film having good sliding and stain-proofing properties and corrosion resistance, and prepared by adding an organic medium having a boiling point higher than 100° C. to an aqueous dispersion comprising colloidal particles of PTFE which is prepared by emulsion polymerization and then removing water from the mixture by heating (an azeotropic method. see Japanese Patent Publication No. 18775/1974).

Since the PTFE colloidal particles prepared by the emulsion polymerization are hardly redispersed once they are agglomerated, a large amount of a surfactant is added to the aqueous dispersion to prevent agglomeration.

A low molecular weight PTFE which is relatively less agglomerated is disclosed (cf. Japanese Patent Publication No. 31096/1972). To the same end, a copolymer of tetrafluoroethylene (TFE) and hexafluoropropylene (HFP) (this copolymer being referred to as "FEP") which is less agglomerated than PTFE is used (cf. U.S. Pat. No. 2,937,156, GB Patent No. 1,094,349 and Japanese Patent Publication No. 17548/1973).

To prepare the organosol of PTFE, Japanese Patent Publication No. 17016/1974 discloses a phase transfer method which comprises adding PTFE to a phase transfer agent such as a water-soluble organic solvent or an aqueous solution of an electrolyte and stirring the mixture to transfer PTFE particles to a phase transfer liquid such as an organic solvent which is insoluble or hardly soluble in water. In this method, the FEP particles should be mixed while preventing agglomeration of the PTFE particles.

The coating film prepared from the aqueous dispersion containing a large amount of the surfactant tends to suffer from blisters or discoloration. The coating film prepared from the aqueous dispersion comprising FEP has inferior wear resistance so that its sliding property is greatly deteriorated during use.

In general, the colloidal particles of the high molecular weight PTFE having a molecular weight of, for example, about 1,000,000 or larger are easily fibrillated under small shear force, and fibrils are tangled together to agglomerate. Therefore, it has been impossible to form an organosol from the aqueous dispersion of colloidal particles of PTFE having a high molecular weight by the phase transfer method or by redispersion of the PTFE powder from the aqueous dispersion, which powder is often referred to as fine powder, in the organic solvent.

The formation of organosol of PTFE particles may be made easy through a decrease of the molecular weight of PTFE to several thousand to several hundred thousand by using a large amount of a chain transfer agent during polymerization or by irradiation of the fine powder. However, when PTFE is used for lubrication, the low molecular PTFE is worn heavily.

Blending of PTFE with, thermoplastic or thermosetting resins or elastomers

With utilizing good performances of PTFE such as heat resistance, flame retardance, non-tackiness, low friction, chemical resistance, low dielectric characteristics and the like, PTFE is used to modify other thermoplastic or thermosetting resins or elastomers through blending. Since PTFE has less compatibility with other resins or elastomers, PTFE particles are not sufficiently dispersed in a molded article of the blend. For a long period of time, it has been desired to increase the blending ability of PTFE without deteriorating the good performances of PTFE.

The low molecular weight PTFE which is a so-called "wax" is most widely used for blending. The PTFE wax can be blended with other polymers to some extent, while it has insufficient mechanical properties because of the low molecular weight. The aqueous dispersion or powder of high molecular weight PTFE may be used for blending but has poor dispersibility in other polymers so that dispersion in a submicron order can hardly be expected.

To produce a milky molded article of the thermoplastic or thermosetting resin or the elastomer, an inorganic white pigment such as quartz fine powder, alumina hydrate, aluminum hydroxide and calcium carbonate is added and mixed in the base polymer. Since the inorganic pigment is harder than the base polymer, it appears on the surface of molded article and deteriorates the surface smoothness when the pigment and the polymer are simply mixed. To keep the surface smoothness of the molded article, a special technique is required. When the amount of the inorganic pigment increases, the molded article itself becomes harder resulting in decrease of impact resistance.

Since PTFE powder is white and heat resistant, it is preferred as an organic white pigment which is a substitute for the inorganic white pigment. However, as described before, its addition and mixing is difficult.

As composite PTFE colloidal particles, Japanese Patent Kokai Publication No. 232109/1984 discloses composite particles each comprising a core of PTFE and a shell of a fluorine-containing elastomer, and Japanese Patent Kokai Publication No. 109846/1987 discloses composite particles each comprising a core of PTFE and a shell of a copolymer of TFE and chlorotrifluoroethylene (CTFE).

When the shell is made of the fluorine-containing elastomer, the composite particles have poor redispersibility in an aqueous medium or an organic solvent or poor ability to form the organosol. In particular, in the blending with another polymer, the sliding property of the molded article is deteriorated.

When the shell is made of the TFE/CTFE copolymer, the particles do not have good two-layer structures, and the molded article made from the blend of such composite particles and another polymer has poor wear resistance. It is disadvantage to use a pressure vessel for the polymerization of the core polymer from the view point of economy and apparatus.

Japanese Patent Publication No. 2099/1976 discloses coating of fluororesin particles with a vinyl base resin by seed polymerization of a hydrocarbon type vinyl monomer such as methyl methacrylate in an aqueous dispersion of the fluororesin, whereby electrophoresis of the particle is made easy so that smooth and good electrocoatin,g is achieved. However, when the hydrocarbon type vinyl monomer is polymerized in the aqueous dispersion containing colloidal particles of PTFE, affinity between PTFE and the hydrocarbon type vinyl monomer is poor, so that the PTFE particle surfaces are not coated with the vinyl monomer and new particles consisting of a polymer of the hydrocarbon type vinyl monomer tend to be formed. In addition, since the polymer of the hydrocarbon type vinyl monomer has a low thermal decomposition starting temperature, it should be removed from the electrocoated film before sintering by dipping the coated film in a hydrophilic organic solvent. Otherwise, the coated film tends to crack and no continuous film is obtained.

Japanese Patent Kokai Publication No. 284201/1988 discloses a process for preparing an organosol by polymerizing a fluoro(meth)acrylate in an aqueous dispersion comprising the fluoropolymer to modify the particle surfaces of the fluoropolymer with the fluoro(meth)acrylate polymer. However, since the disclosed fluoro(meth)acrylate polymer has a low glass transition temperature and has poor solvent resistance, the particles tend to agglomerate and fuse together in the organosol. Therefore, a polyfunctional internal cross linking agent should be copolymerized. When the aqueous dispersion is coagulated to prepare powder, the dispersibility of the powder is not good and the powder is hardly dispersed in the submicron order. In addition, since the thermal decomposition starting temperature of the fluoro(meth)acrylate polymer is usually from 200 to 250° C., when the coated film of this polymer is sintered, it tends to crack.

SUMMARY OF THE INVENTION

One object of the present invention is to provide an aqueous dispersion of composite colloidal particles comprising PTFE, which dispersion is suitable for the preparation of an organosol.

Another object of the present invention is to provide a novel composite powder of the fluorine-containing polymer which can be used as a modifier for improving flame retardance, non-tackiness, sliding property, water- and oil-repellence electrical characteristics, soil resistance and weather resistance of the thermoplastic or thermosetting resins and the elastomers or as a white pigment with good dispersibility.

A further object of the present invention is to provide a novel organosol of a fluorine-containing polymer which is suitable to coat articles which are required to have non-tackiness, sliding property, water- and oil-repellence, soil resistance, corrosion resistance and weather resistance.

According to a first aspect of the present invention, there is provided an aqueous dispersion comprising composite colloidal particles having an average particle size of 0.05 to 1.0 micrometer each of which comprises a core made of a copolymer comprising 99-100% by weight of tetrafluoroethylene and 0 to 1% by weight of a fluorine-containing olefin which is copolymerizable with tetrafluoroethylene and a shell made of a polymer having a glass transition temperature of at least 50° C. which comprises (a) 60 to 100% by mole of at least one α-substituted acrylate of the formula:

$$CH_2=CXCOOR_f \quad (I)$$

wherein X is a methyl group, a fluorine atom or a trifluoromethyl group, and $R_f$ is a fluoroalkyl group or a fluoro(alkoxyalkyl) group and (b) 0 to 40% by mole of at least one monomer copolymerizable with said acrylate (I).

According to a second aspect of the present invention, there is provided a fluorine-containing powder which is obtainable by coagulating and drying the aqueous dispersion of the present invention.

According to a third aspect of the present invention, there is provided an organosol composition of a fluorine-containing polymer which is obtainable from the aqueous dispersion of the present invention by the phase transfer method or the azeotropic method or obtainable by dispersing the polymer powder of the present invention in an organic medium.

DETAILED DESCRIPTION OF THE INVENTION

The aqueous dispersion of the colloidal fluorine-containing polymer particles according to the present invention may be prepared by the following process:

In an aqueous medium containing an anionic surfactant which acts as an emulsifier and has substantially no telogen activity, 99 to 100% by weight of TFE and 0 to 1% by weight of other copolymerizable fluoroolefin are polymerized. Then, by so-called seed polymerization, is polymerized a polymer having a glass transition temperature of at least 50° C. comprising 60 to 100% by mole of α-substituted acrylate (I) and 0 to 40 of the copolymerizable monomer.

The first polymerization step for preparing the core is carried out according to an emulsion polymerization procedure which is conventional in the TFE polymerization. For example, under the reaction conditions such as the reaction pressure of from 6 to 40 kg/cm² and the reaction temperature of from 10 to 120° C., TFE and optionally the other copolymerizable olefin are polymerized in the presence of a polymerization initiator in an aqueous medium containing a water-soluble fluorine-containing dispersant.

Examples of the polymerization initiator are water-soluble organic or inorganic peroxides (e.g. disuccinic acid peroxide (DSAP) or persulfates) or their combination with a reducing agent.

Examples of the water-soluble fluorine-containing dispersant are compounds of the formula:

$$C_aF_{2a+1}COOZ$$

or $$C_3F_7O[CF(CF_3)CF_2O]_bCF(CF_3)COOZ$$

wherein a is an integer of 6 to 9, b is 1 or 2 and Z is NH$_4$ or an alkali metal. Such dispersant is used in an amount of 0.03 to 1% by weight based on the weight of the aqueous medium.

A specific example of the other fluorine-containing olefin is a compound of the formula:

$$A(CF_2)_cO_dCF=CF_2$$

wherein A is a hydrogen atom, a chlorine atom or a fluorine atom, c is an integer of 1 to 6 and d is 0 or 1; a compound of the formula:

$$C_3F_7O[CF(CF_3)CF_2O]_p\text{—}CF\text{=}CF_2$$

wherein p is an integer of 1 to 4; a compound of the formula:

$$A(CF_2)_eCA'\text{=}CH_2$$

wherein A is the same as defined above, A' is a hydrogen atom or a fluorine atom and e is an integer of 1 to 6; CTFE; VdF and trifluoroethylene (TrFE).

The PTFE prepared in this step preferably has a molecular weight of at least 1,000,000. When the molecular weight is smaller, the wear resistance of the coating film tends to decrease. The molecular weight can be controlled by adjusting the amount of the polymerization initiator. The waxy low molecular weight PTFE has a molecular weight of several thousand to several hundred thousand. In some special cases, the molecular weight of PTFE may be decreased by the addition of hydrocarbons or halogenated hydrocarbons (e.g. methane, chloromethane, 1,1-dichloroethylene, etc.) as chain transfer agents.

When TFE and optionally the other copolymerizable olefin are polymerized in the first polymerization step, the finally prepared composite particles have a comparatively small particle size so that the dispersibility during polymerization is improved.

In the first polymerization step, as the dispersion stabilizer for the colloidal particles, a hydrocarbon or halogenated hydrocarbon which is liquid at the polymerization temperature, insoluble in water and inactive to the polymerization reaction can be added to the reaction system.

Examples of the $R_f$ group contained in the α-substituted acrylate (I) to be used in the second polymerization step are —$(CH_2)_qC_rF_{2r}E$ in which q is 1 or 2, r is an integer of 1 to 8 and E is a hydrogen atom or a fluorine atom, —$CH_2CF_2CFHCF_3$, —$CH_2CH(CF_3)_2$, —$CH_2CF(CF_3)_2$, —$C(CH_3)_2$—$CF_2CF_2H$, —$CH(CH_3)CF_3$, —$CH_2CF(CF_3)OC_3F_7$, —$CG(CF_3)_2$ in which G is a hydrogen atom, a fluorine atom or a trifluoromethyl group, $$-(CH_2)_s\underset{\underset{CF_3}{|}}{\overset{\overset{CF_3}{|}}{C}}L$$

in which L is a methyl group, a trifluoromethyl group or a fluorine atom and s is 1 or 2, etc. As the $R_f$ group, $$-\underset{\underset{CF_3}{|}}{\overset{\overset{CF_3}{|}}{C}}L$$

in which L is the same as defined above is preferred.

Among the $R_f$ groups, those having 10 or less carbon atoms are preferred.

When the composite powder is prepared by coagulating the copolymer particles at room temperature, the shell forming resin as such, has a glass transition temperature of at least 50° C. When the organosol is prepared, the shell forming resin preferably has a glass transition temperature of at least 50° C. to improve the solvent resistance and dispersion stability. In the case of the organosol, more preferably, the shell forming resin is the polymer of α-fluoroacrylate.

In general, the shell forming resin is a polymer comprising at least one α-substituted acrylate (a). The shell forming resin does not necessarily comprise the other copolymerizable monomer. To improve the solvent resistance and dispersion stability of the particles in the organosol, the polyfunctional internal cross linking monomer may be copolymerized.

The type of polyfunctional internal cross linking monomer is not critical. Preferably, poly(meth)acrylates of aliphatic polyhydric alcohols are used. Specific examples of such poly(meth)acrylate are ethylene glycol di(meth)acrylate, diethylene glycol di(meth)acrylate, triethylene glycol di(meth)acrylate, dipropylene glycol di(meth)acrylate, 1,3-butylene glycol di(meth)acrylate, trimethylolpropane tri(meth)acrylate, tetramethylolmethane tetra(meth)acrylate, and the like. Also, divinylbenzene, N,N'-methylenebisacrylamide and the like may be used as the polyfunctional internal cross linking agents.

The aqueous dispersion of the colloidal fluorine-containing polymer particles according to the present invention is prepared by polymerizing the above described monomer(s) in an aqueous medium in the presence of a water-soluble radical polymerization initiator in the so-called seed polymerization method using the polymer particles prepared in the above first step as the cores.

Specific examples of the polymerization initiator are persulfates (e.g. potassium persulfate, sodium persulfate, ammonium persulfate, etc.), and redox polymerization systems comprising such peroxide and thiosulfates (e.g. sodium thiosulfate, potassium thiosulfate, sodium hydrogen thiosulfate, etc.) or sulfites (e.g. sodium thiosulfate, potassium thiosulfate, sodium hydrogen thiosulfate, etc.).

The polymerization temperature in the second step is selected from the range of 0 to 100° C. according to the decomposition temperature of the polymerization initiator. Usually, the polymerization temperature is from 10 to 80° C.

During the polymerization, the emulsifier used in the first step is preferably added to stabilize the polymerization system and to reduce the amount of the agglomerated polymer, although the emulsifier may not be further added. The further added emulsifier is not necessarily the same as that used in the first step and may be any of the conventionally used hydrocarbon type nonionic or ionic surfactants.

The prepared colloidal particles of the fluorine-containing polymer is deemed to have a core-shell two layer structure. The weight ratio of the core to the shell is from 97:3 to 30:70, preferably from 85:15 to 40:60.

When the particles are used as a white pigment, it is possible to reduce the weight ratio of the core. To redisperse the particles in the aqueous medium or the organic medium or to prepare the organosol, the weight of the shell should be at least 4% by weight based on the weight of the particle.

When the weight of the core is too small, the coating film prepared from the organosol has deteriorated wear resistance and sliding property, or the particles cannot impart good sliding property to the thermoplastic or thermosetting resins or the elastomers in which the particles are blended.

The above weight ratio of the core to the shell is based on the assumption that the core and the shell have a clear boundary between them. The core and the shell do not necessarily have a clear boundary.

The composite colloidal particles of the fluorine-containing polymer according to the present invention has an average particle size of 0.05 to 1 μm, preferably 0.1 to 0.5 μm. The particle size of the colloidal particles can be controlled by the conventional methods employed in the emulsion polymerization of TFE. The average particle size of the colloidal particles greatly influences the aqueous or organic dispersion composition.

The solid content of the finally produced aqueous dispersion of the fluorine-containing polymer according to the present invention is usually from 10 to 50% by weight, preferably from 20 to 40% by weight based on the weight of the aqueous medium.

The organosol composition of the present invention can be prepared from the aqueous dispersion of the fluorine-containing polymer according to the present invention by the following procedures.

Preparation of organosol composition by the phase transfer method (1) Per 100 parts by weight of the fluorine-containing polymer in the aqueous dispersion, 50.to 500 parts by weight, preferably 100 to 200 parts by weight of an organic compound which is insoluble or hardly soluble in water and in the liquid state around room temperature (a phase transfer liquid) is added to the aqueous dispersion, and the mixture is gently stirred.

(2) To the mixture, an aqueous solution of an electrolyte or an organic compound which can be dissolved in water in any ratio (a phase transfer agent) is added in an amount of 50 to 2000 parts by weight, preferably 250 to 1000 parts by weight per 100 parts by weight of the fluorine-containing polymer. The mixture is gently stirred and then kept standing (3) Since the fluorine-containing polymer is precipitated together with the phase transfer liquid, the upper layer comprising water is removed. To the precipitated layer comprising the fluorine-containing polymer and a small amount of water, an organic medium is added.

(4) The mixture obtained in the previous step (3) is heated around 100° C. while stirring to evaporate water off to decrease the water content to less than the standard value, which is 5000 ppm or less in the below described Preparation Examples.

(5) If desired, a film forming material which will be explained is added.

Specific examples of the phase transfer liquid are hexane, heptane, octane, benzene, toluene, methyl isobutyl ketone and the like.

Specific examples of the electrolyte in the phase transfer agent are salts of alkali metals or alkaline earth metals such as sodium sulfate, magnesium chloride, sodium nitrate, potassium acetate and the like. The electrolyte is used in the form of an aqueous solution having a concentration of 0.01 to 50% by weight, preferably 0.1 to 10% by weight.

Specific examples of the organic compound as the phase transfer agent are organic liquids which are liquids at room temperature and have boiling points not higher than 200° C. such as acetone, methanol and the like.

The organic medium used in the step (3) means an organic liquid which is insoluble or hardly soluble in water and evaporates azeotropically with water. Examples of such organic liquid are aromatic hydrocarbons (e.g. benzene, toluene and xylene) and ketones (e.g. methyl isobutyl ketone and diisobutyl ketone). Among them, toluene and methyl isobutyl ketone are preferred from the economical view point.

In addition to the above method, the organosol can be prepared by any of the conventional methods, for example, an azeotropic method which comprises dropwise adding an organic solvent which is azeotropically boiled with water to the aqueous dispersion of the fluorine-containing polymer which has been polymerized and removing water in the form of an azeotropic mixture with the organic solvent, or a filtration method which comprises filtering the aqueous dispersion of the fluorine-containing polymer which has been polymerized to which an organic solvent may be added and then redispersing a filter cake in the organic liquid.

Preparation of organosol composition from powder of fluorine-containing polymer

According to the method disclosed in U.S. Pat. No. 2,593,583, the organosol composition of the present invention can be prepared by coagulating the fluorine-containing polymer from the aqueous dispersion of the present invention with a coagulating agent by a conventional method, drying the coagulated fluorine-containing polymer at a temperature lower than the melting point of the polymer which forms the shell and dispersing the dried powder in the organic solvent by mechanical stirring or with the application of ultrasonic wave.

Specific examples of the coagulating agent are conventionally used inorganic acids or bases, water-soluble inorganic salts, organic solvents and the like.

Insofar as the organic solvent can wet the surfaces of the fluorine-containing polymer particles, the organosol can be formed.

To the organosol composition of the present invention, a film forming agent comprising the thermoplastic or thermosetting polymer is preferably added to increase the strength of the coating film prepared from the organosol composition.

Specific examples of the film forming agent are nitrocellulose, cellulose acetate butyrate, alkyd polymers, polyesters, polyurethanes, phenol/formaldehyde polymers, urea/formaldehyde polymers, melamine/formaldehyde polymers, epoxy polymers, polyimides, polyamides, polyamideimides, polyethersulfones, polyphenylenesulfides, silicone polymers, etc. Also, a combination of a carboxylic dianhydride and a dianiline from which the polyimide is obtained can be used. Examples of the acid dianhydride are pyromellitic dianhydride, benzophenonetetracarboxylic dianhydride, etc, and examples of the dianiline are oxydianiline, methylenedianiline, etc. Among them, polyimides, polyamides and polyamideimides are preferred because of good strength of the coating film.

The weight ratio of the composite fluorine-containing polymer particles of the present invention to the organic medium in the organosol composition is usually from 5:95 to 50:50, preferably from 20:80 to 40:60.

When the film forming material is used, the weight ratio of the composited fluorine-containing polymer particles to the film forming material is usually from 5:95 to 90:10, preferably from 30:70 to 70:30.

The organosol composition as such or its mixture with the film forming material can be used as a non-aqueous coating.

The aqueous dispersion of the present invention as such, a concentrated liquid prepared from a mixture of the aqueous dispersion and a stabilizer such as a non-ionic surfactant or the aqueous dispersion to which an organic or inorganic filler or an aqueous dispersion of other fluorine-containing polymer is added can be used as a water-base coating.

The non-aqueous coating or the water-base coating can be applied to various materials. For example, it can be impregnated in organic or inorganic woven or non-woven fabrics or coated on metals such as aluminum or iron, or ceramics by spray coating, brush coating or dip coating. The materials to be coated include various industrial or domestic articles such as cooking utensils, boilers, molds, tent materials, rollers, pistons and bearings.

In case of the spray coating, since the aqueous dispersion of the present invention has excellent dispersion stability, a nozzle is hardly clogged and workability is increased.

Since the organosol composition of the present invention contains the composite fluorine-containing polymer colloidal particles, the sliding properties of the coated materials are considerably improved. When the surface of coating film is abrased, the sliding properties are further improved, since the PTFE in the cores appears on the surface of the coating film and its inherent low friction characteristics can be used on the surface. Such the effect can be achieved by the composite colloidal particles having the core-shell structure but cannot be achieved with a simple colloidal particles consisting of the same polymer as the core polymer of the present invention.

Japanese Patent Kokai Publication No. 109846/1987 discloses composite particles consisting of the core made of PTFE and the shell made of the TFE/CTFE copolymer. But, the core-shell two-layer structure is not sufficiently formed, so that the wear resistance of the coating film is inferior to the present invention. In addition, the invention of the above Japanese Patent Kokai Publication required a pressure vessel and is disadvantageous from the view point of economy and apparatus. For the same reason, the coating film from an organosol composition comprising a FEP base polymer has inferior wear resistance to the present invention.

Since the shell forming polymer of the present invention has the relatively high glass transition temperature and good solvent resistance, when it is formulated as the organosol, the polymer particles are less agglomerated or fused together and are stable in the dispersion without the copolymerization of the polyfunctional internal cross linking agent. When the aqueous dispersion is coagulated to form the powder, the powder has good dispersibility and can be dispersed in the submicron order. When the shell forming polymer is the α-fluoroacrylate polymer having the high thermal decomposition starting temperature, the polymer coating can be continuous even when the coating is sintered at a temperature of 200° C. or higher.

Besides the organosol component, the fluorine-containing polymer powder of the present invention can be used as a white pigment or a modifier which improves flame-retardance, non-tackiness, sliding properties, water- and oil-repellence, electrical characteristics, soil resistance, corrosion resistance and weather resistance of the thermoplastic or thermosetting resins or the elastomers.

The fluorine-containing polymer powder of the present invention can be blended as the white pigment in homo- or co-polymers of methacrylates, acrylates or styrene which are colorless and transparent. Alternatively, the fluorine-containing polymer powder can be added as the modifier for engineering plastics such as polyacetal, polycarbonate, polyetheretherketone, whole aromatic polyester, polyethylene terephthalate, polyphenylene sulfide, polyamide, polyphenylene oxide, polybutylene terephthalate, polysulfone, polyethersulfone, polyimide and the like. The fluorine-containing polymer particles of the present invention has better blending properties than the conventional PTFE particles.

In addition, the fluorine-containing polymer powder of the present invention may be used as a standard sample for various tests, an ink, a cosmetic pigment, a coating additive, a toner for electrostatic development, a spacer material for protecting microcapsules, a binder for ceramic molding, a column filler for ion chromatography, a powder for powder coating, and the like.

PREFERRED EMBODIMENTS OF THE INVENTION

The present invention will be illustrated in detail by following Examples, in which "parts" are by weight unless otherwise indicated.

EXAMPLE 1

Preparation of aqueous dispersion

In a stainless steel made 6 liter autoclave equipped with an anchor agitator, baffle plates and a thermometer, deoxygenated deionized water (3 l), a solid paraffin (120 g) and ammonium perfluorooctanoate (3.00 g) were charged and heated to 70° C. The interior gas of the autoclave was purged with nitrogen three times and then with TFE twice.

In the autoclave, TFE was injected to raise the internal pressure to 10 kgf/cm$^2$. To the mixture, a solution of ammonium persulfate (APS) (63 mg) in water (20 ml) was added while stirring to start polymerization. During polymerization, the reaction mixture was stirred at 250 rpm and kept at 70° C. while continuously supplying TFE in the autoclave so as to keep the internal pressure at 10 kgf/cm$^2$. As soon as 1,050 g of TFE was consumed (after about 5.6 hours), the polymerization was terminated.

The colloidal particles of the polymer in the obtained aqueous dispersion was analyzed with a laser beam scattering particle size analyzer system (LPA-3000 manufactured by Otsuka Electronics) to find that the number average particle size was 0.28 μm. The solid content in the aqueous dispersion was 26.8% by weight.

The obtained aqueous dispersion [1](448 g) was charged in a four-necked one liter flask equipped with a stirrer and a reflux condenser. To the dispersion, ion-exchanged water (37 g) was added and the mixture was heated to 60° C. in the nitrogen atmosphere. After adding $CH_2=CF-COOCH_2CF(CF_3)OC_3F_7$ (hereinafter referred to as "11FFA") (24.0 g) to the mixture while stirring at 200 rpm, an aqueous solution of APS (24 mg) (10 ml) and the an aqueous solution of sodium hydrogensulfite (8 mg) (10 ml) were added to start polymerization. After about 1.6 hours, the refluxing ceased and the stirring was stopped. Then, the cooled aqueous dispersion was recovered. The concentration of the aqueous dispersion was 21.9% by weight, the number average particle size measured by the laser beam scattering particle size analyzer system was 0.30 μm, and the particle size distribution was monodisperse.

With the solid obtained by evaporation to dryness of the aqueous dispersion was subjected to the thermogravimetric analysis by using an apparatus for simultaneously carrying out differential calorimetry and thermogravimetry (Type DTG-30 manufactured by Shimadzu) at a heating rate of 10° C./min. Thermal decomposition starting temperatures were observed at about 295° C. which might be attributed to the 11FFA polymer forming the shell and at about 473° C. which might be attributed to PTFE forming the core, and the weight ratio of the former to the latter was about 16:84 which ratio substantially corresponds to the weight ratio calculated from the consumed amounts of the monomers.

Redispersibility of polymer powder

The powder recovered by the evaporation to dryness of the aqueous dispersion was dispersed in each of toluene, methyl isobutyl ketone, ethanol, trichlorotrifluoroethane and a 5% aqueous solution of a commercially available non-ionic surfactant (Triton X-100) while applying ultrasonic wave. The powder particles were easily redispersed.

Preparation of organosol by the phase transfer method

To the obtained aqueous dispersion (each 385 parts), n-hexane (125 parts) as the phase transfer liquid was added. To the mixture, acetone (275 parts) as the phase transfer agent was added while stirring. After stirring for further 5 minutes, the mixture was kept standing, and the supernatant was discarded. To the residual precipitate, methyl isobutyl ketone (300 parts) was added and heated to about 100° C. while stirring to remove water contained in the precipitate. Thereby, the organosol having the solid content of 30% by weight (333 parts) was obtained. The organosol contained about 0.2% by weight of water measured by the Karl Fischer's method.

A latex which was prepared by emulsion polymerizing 11FFA alone was evaporated to dryness at room temperature (25° C.) to obtain fine powder of the polymer, which had the glass transition temperature of 72-85° C. measured with a differential scanning calorimeter (1090 Type manufactured by DuPont) at a heating rate of 20° C./min. The thermal decomposition starting temperature was 295° C.

EXAMPLE 2

Preparation of aqueous dispersion

The polymerization was carried out in the same manner as in Example 1 except that an aqueous dispersion of PTFE containing about 6% by weight of a nonionic surfactant based on the resin solid content (manufactured by Daikin Industries, Ltd. Solid content, 60% by weight) in place of the aqueous dispersion (1), an aqueous dispersion of composite polymer particles was prepared.

The number average particle size of the copolymer particles in the aqueous dispersion measured by the laser beam scattering particle size analyzer system was 0.21 μm, and the particle size distribution was monodisperse. The solid content in the aqueous dispersion was 25.5% by weight.

The powder could be redispersed and the organosol was prepared by the phase transfer method in the same manner as in Example 1 without problems.

COMPARATIVE EXAMPLE 1

In the same manner as in Example 1 but, in the second polymerization step, using a monomer mixture of methyl methacrylate (MMA) (28.5 g) and triethyleneglycol dimethacrylate (3DMA) (1.5 g) in place of 11FAA and additionally using ammonium perfluorooctanoate (2.40 g) as the emulsifier, the reaction was carried out for about 4 hours to obtain an aqueous dispersion.

The number average particle size of the copolymer particles in the aqueous dispersion measured by the laser beam scattering particle size analyzer system was 0.28 μm, and the particle size distribution was monodisperse. The solid content in the aqueous dispersion was 28.1% by weight.

The solid obtained by evaporation to dryness of the aqueous dispersion was subjected to the thermogravimetric analysis. Thermal decomposition starting temperatures were observed at about 180° C. which might be attributed to the MMA/3DMA copolymer forming the shell and at about 475° C. which might be attributed to PTFE forming the core, and the weight ratio of the former to the latter was about 17:83 which ratio substantially corresponds to the weight ratio calculated from the consumed amounts of the monomers.

The powder could be redispersed and the organosol was prepared by the phase transfer method in the same manner as in Example 1 without problems.

COMPARATIVE EXAMPLE 2

In the same manner as in Example 2 but, in the second polymerization step, using a monomer mixture of methyl methacrylate (MMA) (28.5 g) and triethyleneglycol dimethacrylate (3DMA) (1.5 g) in place of 11FAA, the reaction was carried out for about one hour to obtain an aqueous dispersion.

The number average particle size of the copolymer particles in the aqueous medium measured by the laser beam scattering particle size analyzer system was 0.21 μm, but the particle size distribution was bimodal and formation of new particles was observed in the electron microscopic photograph.

The solid content in the aqueous dispersion was 25.6% by weight.

The redispersibility of the powder obtained by evaporation to dryness of the aqueous dispersion was insufficient. In the preparation of an organosol, the polymer particles were agglomerated in the concentration step for azeotropically removing methyl isobutyl ketone and water by heating. Therefore, no organosol of solid content of 30% by weight was obtained.

COMPARATIVE EXAMPLE 3

In the same manner as in Example 1 but using, as a monomer, $CH_2=C(CH_3)COOCH_2CF(CF_3)OC_3F_7$ (11FMA) in place of 11FAA and additionally using ammonium perfluorooctanoate (2.40 g) as the emulsifier, the reaction was carried out for about 4.5 hours to obtain an aqueous dispersion.

The number average particle size of the copolymer particles in the aqueous medium measured by the laser beam scattering particle size analyzer system was 0.30 μm, and the particle size distribution was monodisperse. The solid content in the aqueous dispersion was 27.1% by weight as in Example 1 without problems.

The solid obtained by evaporation to dryness of the aqueous dispersion was subjected to the thermogravimetric analysis. Thermal decomposition starting temperatures were observed at about 233° C. which might be attributed to the 11FMA polymer forming the shell and at about 475° C. which might be attributed to PTFE forming the core, and the weight ratio of the former to the latter was about 17:83 which ratio substantially corresponds to the weight ratio calculated from the consumed amounts of the monomers.

The redispersibility of the powder obtained by coagulating the dispersion and drying was insufficient. In the preparation of an organosol, the polymer particles were agglomerated in the concentration step for azeotropically removing methyl isobutyl ketone and water by heating. Therefore, no organosol of solid content of 30% by weight was obtained.

A latex prepared by emulsion polymerizing 11FMA alone was evaporated to dryness at room temperature (25° C.). But, the polymer formed a film and no polymer powder was obtained. The homopolymer of 11FMA had the glass transition temperature of 25–38° C. and the thermal decomposition starting temperature of 233° C.

COMPARATIVE EXAMPLE 4

In the same manner as described in Preparation Example 1 of Japanese Patent Publication No. 63584/1988 (corresponding to U.S. Pat. No. 4,780,490), an aqueous dispersion having the solid content of 26.1% by weight was obtained. The produced polymer particles consisted of the core made of HFP-modified PTFE and the shell made of the CTFE/TFE copolymer. The content of CTFE in the whole particles was 4.0% by weight, and the content of CTFE in the shell parts was 8.8% by weight. From these contents, the weight ratio of the shell to the core was 45:55. The particles had the average particle size of 0.21 $\mu$m.

The powder could be redispersed in the same manner as in Example 1 although it took more time than in Example 1. The organosol could be prepared by the phase transfer method as in Example 1.

COMPARATIVE EXAMPLE 5

From the aqueous dispersion (1) obtained in the first polymerization step of Example 1, the powder was prepared by coagulation and drying. The obtained powder could not be redispersed. In the phase transfer method, all the polymer particles were coagulated and no organosol was obtained.

COMPARATIVE EXAMPLE 6

In a 300 ml reactor equipped with a stirrer, a reflux condenser and a dropping funnel, an aqueous dispersion of PTFE (particle size: 0.1 to 0.30 $\mu$m, polymer content: 60% by weight) (200 g) and APS (1.0 g) were charged. To the mixture, $CF_3(CF_2)_3(CH_2)_2OCOCH=CH_2$ (3.6 g) was dropwise added from the dropping funnel over about 5 minutes while stirring followed by stirring at room temperature for 5 minutes. Thereafter, the reaction mixture was stirred at 60° C. for 8 hours.

From the obtained aqueous dispersion, the powder was prepared by coagulation and drying. The obtained powder could be hardly redispersed in water or the organic solvent. In the phase transfer method, all the polymer particles were agglomerated and no organosol was obtained.

COMPARATIVE EXAMPLE 7

In the same manner as in Comparative Example 6 but using $CH_2=CHCOOCH_2C_7F_{15}$ (hereinafter referred to as "15FA") in place of $CF_3(CF_2)_3(CH_2)_2OCOCH=CH_2$, the reaction was carried out to obtain an aqueous dispersion.

From the obtained aqueous dispersion, the powder was prepared by coagulation and drying. The obtained powder could not be redispersed in water or the organic solvent. In the phase transfer method, all the polymer particles were coagulated and no organosol was obtained.

A latex prepared by emulsion polymerizing 15FA alone was evaporated to dryness at room temperature (25° C.). But, the polymer formed a film and no polymer powder was obtained. The homopolymer of 15FA had the glass transition temperature of −17° C.

EXPERIMENT 1

To the organosol composition prepared by the phase transfer method in Example 1 (333 parts), polyamideimide (HI-610 manufactured by Hitachi Chemical Co., Ltd.) (370 parts), carbon (Carbon Neospectra Mark IV manufactured by Columbia Carbon Co., Ltd.) (6 parts) and N-methyl-2-pyrrolidone (272 parts) were added and mixed in a ball mill at 80 rpm at 20° C. for 48 hours.

The mixture was filtered through a 150 mesh net. The viscosity of the filtrate was 27 seconds measured by the Ford Cup No. 4.

The mixture was spray coated on a surface of a degreased aluminum plate with a spray gun having a nozzle diameter of 0.8 mm under pressure of 3 kg/cm$^2$. Then, the coated aluminum plate was dried in an IR heater kept at 80° C. for 30 minutes and baked in an electric furnace kept at 200° C. for 30 minutes to prepare a sample plate coated with the test coating film.

With the prepared coating film, the film thickness and Taber abrasion loss were measured. Before and after the Taber abrasion test, the sliding property (coefficient of friction) was measured.

The film thickness was measured with a high frequency thickness meter (Type ES 8e 3KB4 manufactured by Kett Science Laboratory).

With a Taber type abrasion tester (abrasion disc: CS No. 17, load: 1 kg, 1,000 rpm), an abrased amount (mg) after 1,000 revolutions was measured.

The coefficient of friction was measured with a Bauden-Leben type friction coefficient meter (8 mm steel ball, load: 1 kg, rate: 0.23 cm/sec.).

The results are shown in Table.

COMPARATIVE EXPERIMENTS 1 AND 2

In the same manner as in Experiment 1 but using each of the organosols prepared in Comparative Examples 1 and 4, the same experiments were done.

The coating film formed from a paint obtained from the organosol of Comparative Example 1 was cracked and had very rough surface. Therefore, the film thickness, Taber abrasion loss and a coefficient of friction could not be measured.

The results are shown in Table.

TABLE

| Experiment No. | Film thickness ($\mu$m) | Taber abrasion loss (mg) | Coefficient of friction (before abrasion/after abrasion) |
| --- | --- | --- | --- |
| 1 | 40–50 | 4.2 | 0.04/0.05 |
| Comp. 4 | 40–50 | 7.0 | 0.07/0.06 |

What is claimed is:

1. A fluorine-containing powder contained by coagulating and drying an aqueous dispersion comprising composite colloidal particles having an average particle size of 0.05 to 1.0 micrometer each of which comprises a core made of a copolymer comprising 99–100% by weight of ttetrafluoroethylene and 0 to 1% by weight of a fluorine-containing olefin which is copolymerizable with tetrafluoroethylene and a shell made of a polymer having a glass transition temperature of at least 50° C. which comprises (a) 60 to 100% by mole of at least one α-substituted acrylate of the formula:

$$[CH_2=CXOOR_f] \; CH_2=CXCOOR_f \quad (I)$$

wherein

X is a fluorine atom, and $R_f$ is a fluoroalkyl group or a fluoro(alkoxyalkyl) group and (b) 0 to 40% by mole of at least one monomer copolymerizable with said acrylate (I).

2. The fluorine-containing powder according to claim 1, wherein the weight ratio of the core to the shell of the colloidal particles is from 97:3 to 30:70.

3. The fluorine-containing powder according to claim 1, wherein the α-substituted acrylate (I) is an α-fluoroacrylate.

4. The fluorine-containing powder according to claim 1, wherein the fluorine-containing olefin which is copolymerizable with tetrafluoroethylene is at least one member selected from the group consisting of a compound of the formula:

$$A(CF_2)_cO_dCF=CF_2$$

wherein A is a hydrogen atom, a chlorine atom or a fluorine atom, C is an integer of 1 to 6 and d is 0 or 1; a compound of the formula:

$$C_3F_7O[CF(CF_3)CF_2O]_p-CF=CF_2$$

wherein p is an integer of 1 to 4; a compound of the formula:

$$A(CF_2)_eCA'=CH_2$$

wherein A is the same as defined above, A' is a hydrogen atom or a fluorine atom and e is an integer of 1 to 6; chlorotrifluoroethylene; vinylidene fluoride and trifluoroethylene.

5. An organosol composition comprising composite fluorine-containing polymer colloidal particles having an average particle size of 0.05 to 1.0 micrometer each of which comprises a core made of a copolymer comprising 99–100% by weight of tetrafluoroethylene and 0 to 1% by weight of a fluorine-containing olefin which is copolymerizable with tetrafluoroethylene and a shell made of a polymer having a glass transition temperature of at least 50° C. which comprises (a) 60 to 100% by mole of at least one α-substituted acrylate of the formula:

$$CH_2=CXCOOR_f \quad (I)$$

wherein X is a fluorine atom, and $R_f$ is a fluoroalkyl group or a fluoro(alkoxyalkyl) group and (b) 0 to 40% by mole of at least one monomer copolymerizable with said acrylate (I).

6. The organosol composition according to claim 5, wherein the weight ratio of the core of the shell of the colloidal particles is from 97:3 to 30:70.

7. The organosol composition according to claim 5, wherein the α-substituted acrylate (I) is an α-fluoroacrylate.

8. The organosol composition according to claim 5, wherein the fluorine-containing olefin which is copolymerizable with tetrafluoroethylene is at least one member selected from the group consisting of a compound of the formula:

$$A(CF_2)_cO_dCF=CF_2$$

wherein A is a hydrogen atom, a chlorine atom or a fluorine atom, c is an integer of 1 to 6 and d is 0 or 1; a compound of the formula:

$$C_3F_7O[CF(CF_3)CF_2O]_p-CF=CF_2$$

wherein p is an integer of 1 to 4; a compound of the formula:

$$A(CF_2)_eCA'=CH_2$$

wherein A is the same as defined above, A' is a hydrogen atom or a fluorine atom and e is an integer of 1 to 6; chlorotrifluoroethylene; vinylidene fluoride and trifluoroethylene.

9. The organosol composition according to claim 5, which is obtainable from an aqueous dispersion comprising composite colloidal particles having an average particle size of 0.05 to 1.0 micrometer each of which comprises a core made of a copolymer comprising 99–100% by weight of tetrafluoroethylene and 0 to 1% by weight of a fluorine-containing olefin which is copolymerizable with tetrafluoroethylene and a shell made of a polymer having a glass transition temperature of at least 50° C. which comprises (a) 60 to 100% by mole of at least one α-substituted acrylate of the formula:

$$CH_2=CXCOOR_f \quad (I)$$

wherein X is a fluorine atom, and $R_f$ is a fluoroalkyl group or a fluoro(alkoxyalkyl) group and (b) 0 to 40% by mole of at least one monomer copolymerizable with said acrylate (I), by the phase transfer method or the azeotropic method or obtainable by dispersing the polymer powder according to claim 9 in an organic medium.

10. The organosol composition according to claim 9, wherein the weight ratio of the core to the shell of the colloidal particles is from 97:3 to 30:70.

11. The organosol composition according to claim 9, wherein the α-substituted acrylate (I) is an α-fluoroacrylate.

12. The organosol composition according to claim 9, wherein the fluorine-containing olefin which is copolymerizable with tetrafluoroethylene is at least one member selected from the group consisting of a compound of the formula:

$$A(CF_2)_cO_dCF=CF_2$$

wherein A is a hydrogen atom, a chlorine atom or a fluorine atom, c is an integer of 1 to 6 and d is 0 or 1; a compound of the formula:

$$C_3F_7O[CF(CF_3)CF_2O]_p-CF=CF_2$$

wherein p is an integer of 1 to 4; a compound of the formula:

$$A(CF_2)_eCA'=CH_2$$

wherein A is the same as defined above, A' is a hydrogen atom or a fluorine atom and e is an integer of 1 to 4; chlorotrifluoroethylene; vinylidene fluoride and trifluoroethylene.

13. The organosol composition according to claim 5, which further comprises at least one film forming material selected from the group consisting of polyethersulfone, polyphenylene sulfide, polyimide, polyamide and polyamideimide.

14. The organosol composition according to claim 6, which further comprises at least one film forming material selected from the group consisting of polyethersulfone, polyphenylene sulfide, polyimide, polyamide and polyamideimide.

15. The organosol composition according to claim 7, which further comprises at least one film forming material selected from the group consisting of polyethersulfone, polyphenylene sulfide, polyimide, polyamide and polyamideimide.

16. The organosol composition according to claim 8, which further comprises at least one film forming material selected from the group consisting of polyethersulfone, polyphenylene sulfide, polyimide, polyamide and polyamideimide.

* * * * *